US011494774B2

(12) United States Patent
Lu et al.

(10) Patent No.: US 11,494,774 B2
(45) Date of Patent: *Nov. 8, 2022

(54) METHOD, APPARATUS AND ELECTRONIC DEVICE FOR IDENTIFYING RISKS PERTAINING TO TRANSACTIONS TO BE PROCESSED

(71) Applicant: Advanced New Technologies Co., Ltd., Grand Cayman (KY)

(72) Inventors: Yicheng Lu, Zhejiang (CN); Tao Chen, Zhejiang (CN); Wenbiao Zhao, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,164

(22) Filed: Jun. 13, 2019

(65) Prior Publication Data

US 2019/0295092 A1 Sep. 26, 2019

Related U.S. Application Data

(63) Continuation of application No. PCT/CN2018/091042, filed on Jun. 13, 2018.

(30) Foreign Application Priority Data

Jun. 15, 2017 (CN) .......................... 201710452172.6

(51) Int. Cl.
*G06Q 20/40* (2012.01)
*G06N 20/00* (2019.01)
(Continued)

(52) U.S. Cl.
CPC ......... *G06Q 20/4016* (2013.01); *G06N 20/00* (2019.01); *G06Q 10/0635* (2013.01);
(Continued)

(58) Field of Classification Search
CPC ........... G06Q 20/4016; G06Q 10/0635; G06Q 20/4014; G06Q 20/40; G06Q 10/06;
(Continued)

(56) References Cited

U.S. PATENT DOCUMENTS 5,819,226 A * 10/1998 Gopinathan ........... G06Q 20/00
705/44
8,490,162 B1 * 7/2013 Popoveniuc ........ H04L 63/1433
726/5
(Continued)

FOREIGN PATENT DOCUMENTS

| CN | 104202339 A | 12/2014 |
|---|---|---|
| CN | 106503562 A | 3/2017 |

(Continued)

OTHER PUBLICATIONS

Extended European Search Report for European Application No. 18817011.2 from the European Patent Office, dated Jan. 13, 2020.
(Continued)

*Primary Examiner* — Kenneth Bartley
(74) *Attorney, Agent, or Firm* — Finnegan, Henderson, Farabow, Garrett & Dunner, LLP

(57) ABSTRACT

A method for identifying a risk pertaining to a transaction to be processed, includes: identifying a risk pertaining to a transaction to be processed via a fast identification layer in a risk control system, thereby obtaining a first identification result; identifying a risk of interference pertaining to the transaction to be processed via a model for identifying transactions susceptible to interference, thereby obtaining a second identification result; and determining a processing manner for the transaction to be processed based on the first identification result and the second identification result, the processing manner including releasing the transaction to be processed, or further identifying the risk pertaining to the (Continued)

transaction to be processed via the in-depth identification layer in the risk control system.

15 Claims, 7 Drawing Sheets

(51) Int. Cl.
*G06Q 10/06* (2012.01)
*H04L 9/40* (2022.01)

(52) U.S. Cl.
CPC ..... *G06Q 20/4014* (2013.01); *H04L 63/1433* (2013.01); *H04L 63/20* (2013.01)

(58) Field of Classification Search
CPC ..... G06N 20/00; H04L 63/1433; H04L 63/20; H04L 9/40
See application file for complete search history.

(56) References Cited

U.S. PATENT DOCUMENTS

| | | | |
|---|---|---|---|
| 9,047,608 B1 | 6/2015 | Einav | |
| 9,178,858 B1 | 11/2015 | Mussman et al. | |
| 2005/0097320 A1 | 5/2005 | Golan et al. | |
| 2005/0182712 A1 | 8/2005 | Angell | |
| 2005/0234763 A1 | 10/2005 | Pinto et al. | |
| 2010/0169192 A1* | 7/2010 | Zoldi .................... | G06Q 40/12 705/30 |
| 2014/0304158 A1 | 10/2014 | Basu et al. | |
| 2016/0104163 A1 | 4/2016 | Aquino et al. | |

FOREIGN PATENT DOCUMENTS

| | | |
|---|---|---|
| CN | 106557955 A | 4/2017 |
| CN | 106656932 A | 5/2017 |
| KR | 10-2016-0070379 | 6/2016 |
| KR | 10-2017-0041731 | 4/2017 |
| WO | WO 98/54667 | 12/1998 |
| WO | WO 2017/076176 A1 | 5/2017 |
| WO | WO-2019156680 A1 * | 8/2019 |

OTHER PUBLICATIONS

Examination Report in Indian Application No. 201917024834, dated May 17, 2021.
Examination Report for European Application No. 18817011.2, dated Jan. 15, 2021.
Written Opinion for Application No. 11201905799W, issued by the Intellectual Property Office of Singapore, dated Feb. 26, 2021.
Decision to Grant from the Japanese Patent Office for Japanese Patent Application No. 2019-529920, dated Apr. 2, 2021.
Notice of Preliminary Rejection in Korean Application No. 10-2019-7017081, dated Mar. 29, 2021.
International Search Report in International Application No. PCT/CN2018/091042, dated Aug. 29, 2018.
Written Opinion for Application No. 11201905799W, issued by the Intellectual Property Office of Singapore, dated May 18, 2020.

* cited by examiner

METHOD, APPARATUS AND ELECTRONIC DEVICE FOR IDENTIFYING RISKS PERTAINING TO TRANSACTIONS TO BE PROCESSED

CROSS-REFERENCE TO RELATED APPLICATIONS

This application is a continuation application of International Application No. PCT/CN2018/091042, filed on Jun. 13, 2018, which is based upon and claims priority to Chinese Patent Application No. 201710452172.6, filed on Jun. 15, 2017, the entire content of all of which is incorporated herein by reference.

TECHNICAL FIELD

This application involves the technical field of risk control, in particular, a method, apparatus, and electronic device for identifying risks pertaining to transactions to be processed.

TECHNICAL BACKGROUND

Among related technologies, more and more transactions are being processed on online platforms instead of traditional ways. Users only need to register corresponding user accounts on an online platform before he or she is able to complete transactions on the online platform using the registered user account. However, while online platforms bring convenience to transactions, they bring about security issues too. For example, if a user account is leaked, it is subject to the risk of theft and may even cause serious losses.

To address this, a risk control system has been established in the related technologies for transactions that are processed on online platforms to assess the risks of transactions, thereby detecting potential security risks as early as possible and avoiding account theft.

However, the risk control system may over-assess risks pertaining to transactions for some reasons, resulting in false positives of account theft risks even in the case where no account theft risk is existent. As a result, the transaction is required to perform user authentication, the transaction is deemed as not successfully processed, and the use account becomes restricted, thereby "disturbing" the user. The transaction is therefore an interfered transaction. Interfered transactions not only result in additional operations, lengthen the processing time, but may also reduce success rate of the transactions.

SUMMARY

In view of this, this application provides a method, apparatus and electronic device for identifying a risk pertaining to a transaction to be processed, which can lower the improvement requirements needed for a risk control system, and improve the efficiency and accuracy of identification of transactions susceptible to interference.

According to a first aspect, a method for identifying a risk pertaining to a transaction to be processed, comprises: identifying a risk pertaining to transaction to be processed via a fast identification layer in the risk control system, thereby obtaining a first identification result; identifying a risk of interference pertaining to the transaction to be processed via a model for identifying transactions susceptible to interference, thereby obtaining a second identification result; and determining a processing manner for the transaction to be processed based on the first identification result and the second identification result, the processing manner including releasing the transaction to be processed, or further identifying the risk pertaining to the transaction to be processed via an in-depth identification layer in the risk control system.

According to a second aspect, an electronic device comprises: a processor; and a memory storing instructions executable by the processor; wherein the processor is configured to: identify a risk pertaining to a transaction to be processed via a fast identification layer in the risk control system, thereby obtaining a first identification result; identify a risk of interference pertaining to the transaction to be processed via a model for identifying transactions susceptible to interference, thereby obtaining a second identification result; and determine a processing manner for the transactions to be processed based on the first identification result and the second identification result, the processing manner including releasing the transaction to be processed, or further identifying the risk pertaining to the transaction to be processed via an in-depth identification layer in the risk control system.

According to a third aspect, a non-transitory computer-readable storage medium has stored therein instructions that, when executed by a processor of a device, cause the device to perform the methods as described in the first aspect.

It can be seen that the technical solution identifies transactions susceptible to interference via a fast identification layer and a model for identifying transactions susceptible to interference before the in-depth identification of the risk control system, thereby identifying transactions susceptible to interference quickly and accurately in the scenario where risks are controllable, and reducing the probability of transactions susceptible to interference being interfered with, as well as reducing the impact on the risk control system and lowering the improvement requirements needed for the risk control system.

DETAILED DESCRIPTION OF EMBODIMENTS

Figure 1:
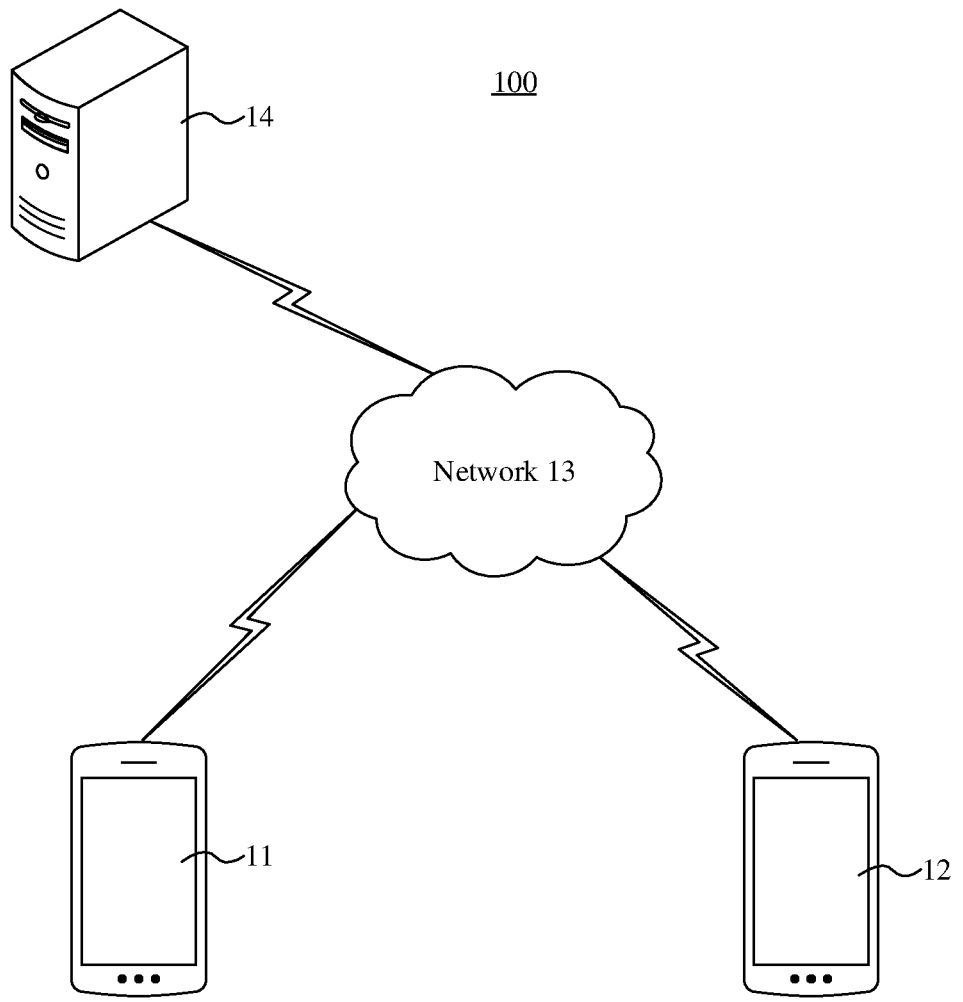
FIG. 1 is a schematic diagram of a risk identification system for transactions to be processed according to an exemplary embodiment.

FIG. 1 is a schematic diagram of a risk identification system 100 for transactions to be processed, according to an exemplary embodiment. As shown in FIG. 1, the system 100 may include electronic devices, such as a mobile phone 11 and a mobile phone 12, a network 13, and a server 14.

The mobile phones 11 and 12 are exemplary electronic devices usable by users. Examples of the electronic devices may also include: a tablet, a laptop, a pocket PC or PDA (Personal Digital Assistant), wearable devices (e.g., smart glasses, smart watches), etc., which are not limited here. When running, the electronic device may run a client program of an application to achieve relevant transaction functions of the application. For example, the relevant transaction functions may include the transactions to be processed, e.g. a payment transaction, etc.

The server 14 may include a physical server with dedicated hosting, or may be a virtual server hosted on a server cluster, or may be a cloud server. When running, the server 14 may load and run a risk control system, thereby achieving risk control functions and identification functions for transactions susceptible to interference.

The network 13 may provide interaction between the mobile phones 11 and 12 and the server 14, and may include one or more types of wired and wireless networks. In an embodiment, the network 13 may include a Public Switched Telephone Network (PSTN) and Internet. At the same time, electronic devices such as the mobile phones 11 and 12 can also perform communication interaction through the network 13, for example, establishing and implementing the transactions to be processed between any two electronic devices. The risk control system running on the server 14 can identify an account theft risk of the transactions to be processed to reduce the probability of the account theft risk evolving into an account theft event.

Based on identification principles, the risk control system can accurately identify possible risk issues of the transactions to be processed by using configured identification rules. For example, the identification rules may include manually defined rules or models obtained through machine learning (for example, decision tree-based machine learning or in-depth learning based on neural networks, etc., which are not limited here). Nevertheless, due to the complexity of risk identification, it may be necessary to adopt a large number of identification rules to accurately identify the transactions to be processed. Therefore, the identification process may not only consume a large amount of processing computing resources, but also cause operating users to wait for a long time. In fact, as transactions involving account theft risk generally account for a small portion and most of the transactions are security events, if all transactions undergo the processing of the identification rules, this may lead to the wastage of a large amount of processing computing resources, affect use experience of relevant operating users, and even lower the success rate of transaction processing.

Figure 2:
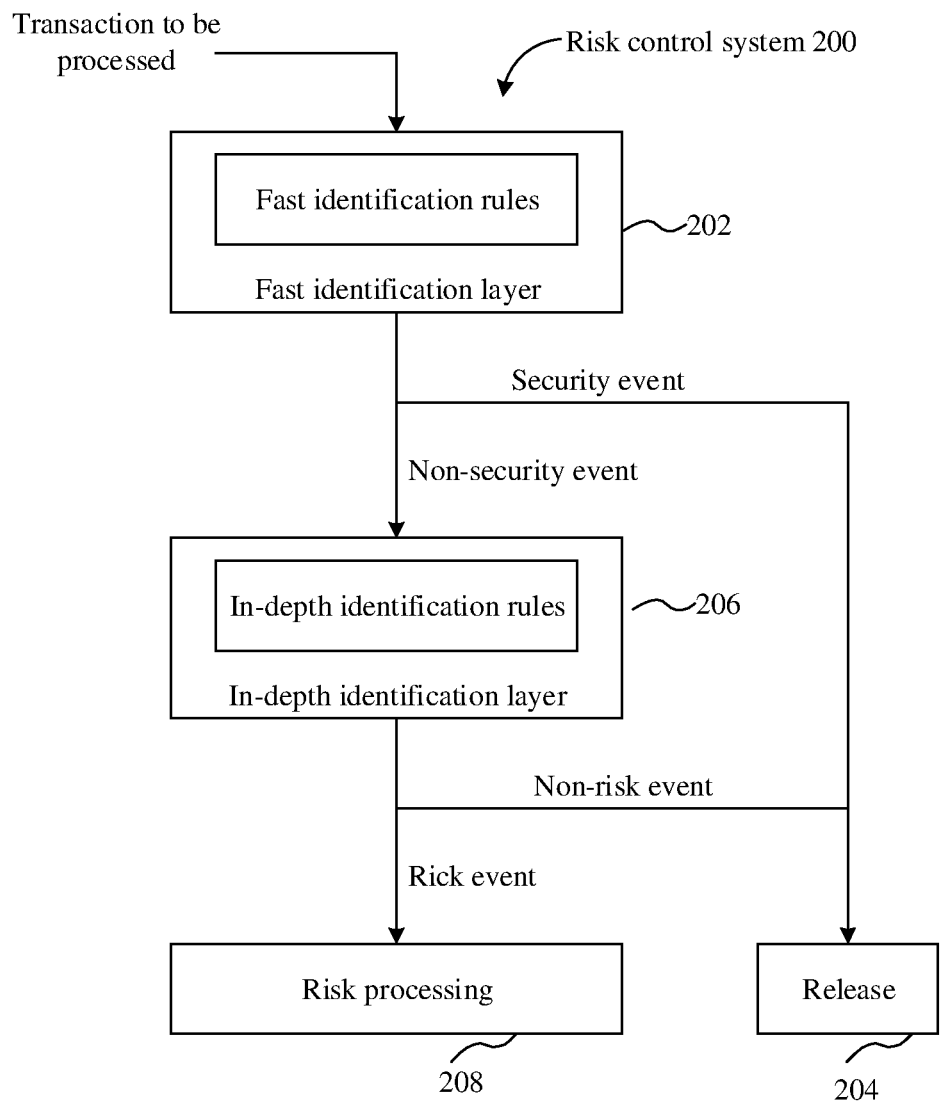
FIG. 2 is a schematic diagram of a risk control system in the related technologies.

Therefore, as shown in FIG. 2, identification rules of a risk control system 200 are divided into two layers in the related technology: a fast identification layer (also referred to as layer T1) and an in-depth identification layer (also referred to as layer T2). When the risk control system 200 detects the transactions to be processed, layer T1 first identifies the transactions to be processed (202); layer T1 is configured with fewer fast identification rules (which may include at least one of the various types of the above-described manually defined rules or machine learning models, etc., which is not limited here), and through these fast identification rules, it can quickly identify the transactions to be processed that are security events (e.g., there is no or almost no risk of account theft). For example, the transactions to be processed may be identified as a security event on layer T1 in most cases and the risk control system 200 may release the transactions to be processed (204) so that the transactions to be processed may continue to be implemented. However, if a transaction to be processed is not identified as a security event, namely, the transaction to be processed is a non-security event in the sense of layer T1 (e.g., the transaction to be processed is not an obvious security event, but there may not necessarily be risk of account theft), then the transaction to be processed can be further transferred to layer T2 for identification (206). Layer T2 is configured with more in-depth identification rules (which may include at least one of the various types of the above-described manually defined rules or machine learning models, etc., which is not limited here), and through these in-depth identification rules, it can accurately identify whether the transaction to be processed has a risk of account theft. If layer T2 is identified as a risk-free event, the risk control system 200 releases the transaction to be processed (204), and if layer T2 identifies a risk event (e.g., there is risk of account theft), the risk control system 200 performs risk processing on the transaction to be processed (208), such as by requiring the operating user to perform identification verification, reporting processing failure, or restricting the authority of the user account corresponding to the operating user. It can be seen that the above-described division of layer T1 and layer T2 can significantly improve the risk identification efficiency of the transactions to be processed.

Figure 3:
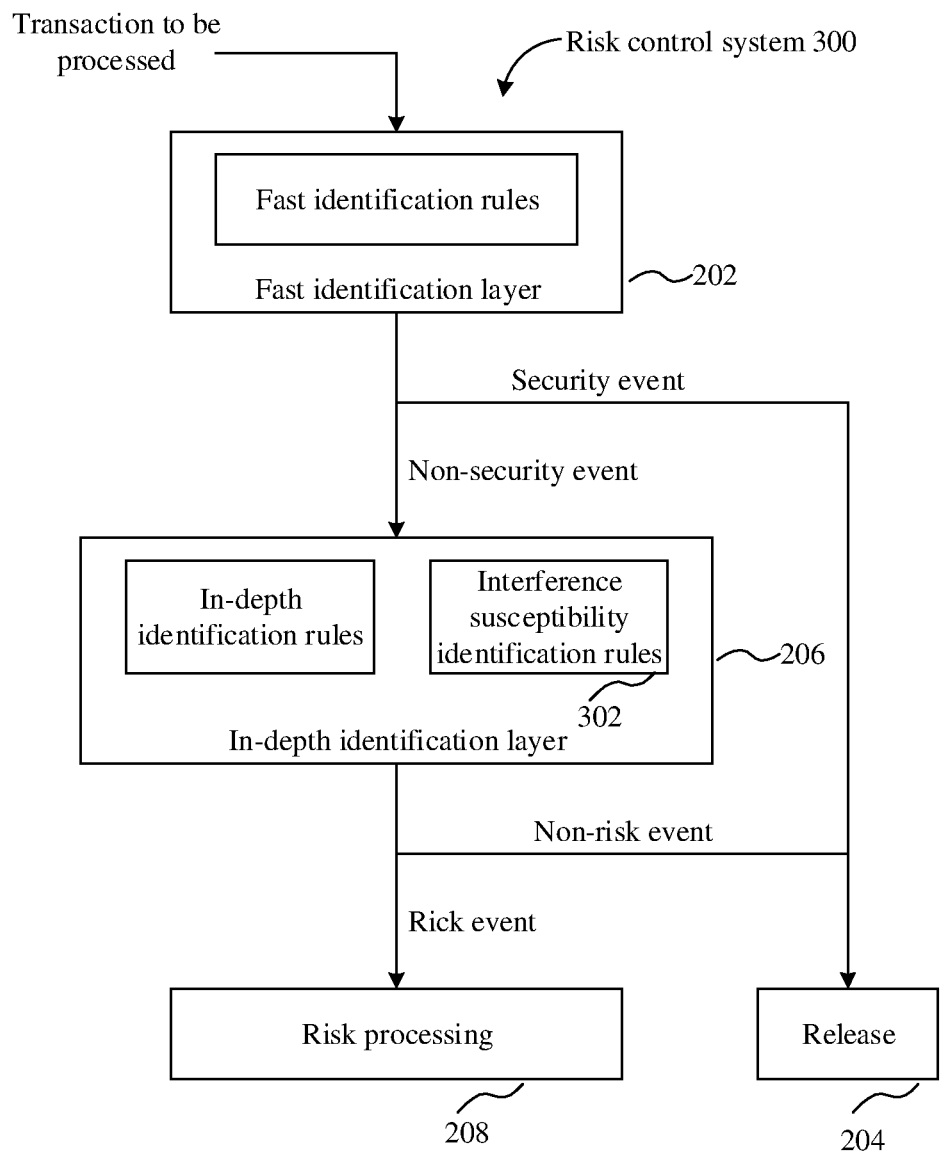
FIG. 3 is a schematic diagram of another risk control system in the related technologies.

Based on the description of the Background section, it can be known that interference may be caused to users when a risk control system is identifying the risk of account theft. To this end, a risk identification process may be implemented to reduce the probability of "disturbing" users. FIG. 3 is a schematic diagram of a risk control system 300 in the related technology for performing identification on transactions susceptible to interference, which means there is a higher probability of the occurrence of the following: the risk control system determines that a transaction is subject to risk of account theft, but the transaction does not actually have this risk (for example, it is subsequently determined that this risk does not exist), thereby causing an "interference" to the corresponding user. As shown in FIG. 3, the related technology follows the identification rules originally adopted by the risk control system 200 (FIG. 2), and rules 302 pertaining to transactions susceptible to interference, which focuses on the transactions susceptible to interference, may be added to the in-depth layer, and the identified transactions susceptible to interference may be released to avoid interference.

As the rules 302 pertaining to transactions susceptible to interference may need to be properly matched with the original identification rules, this may make the configuration process of the rules 302 pertaining to transactions difficult and may easily make an impact on the original identification rules, which not only increase the labor costs of the operator and the maintenance cost of the risk control system, but may even affect the accuracy and efficiency of identifying account theft risk. At the same time, transactions susceptible to interference are easy to update, for example, when there are new interference user groups or new interference scenarios, etc. These may require timely adjustments to the above-described identification rules for interference, thereby further increasing the difficulty and cost of maintaining the risk control system.

In order to solve the above problems in the related technology, a risk identification method is provided. At layer T1, a model for identifying transactions susceptible to interference that is independent of layer T2 is adopted, thereby quickly and accurately identifying transactions susceptible to interference in cases where risk is controllable. Moreover, update processing may be implemented for the model for identifying transactions susceptible to interference, and the maintenance difficulty and maintenance cost of the risk control system can be significantly reduced.

Figure 4:
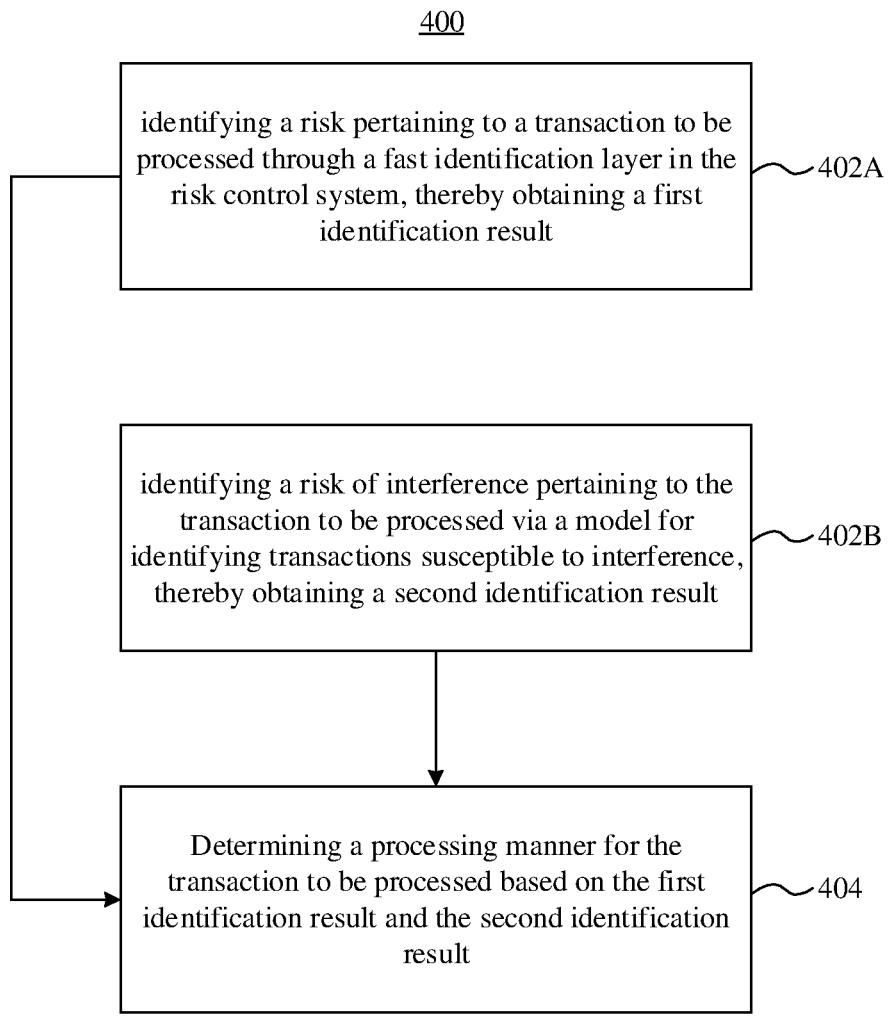
FIG. 4 is a flowchart of a risk identification method for transactions to be processed according to an exemplary embodiment.

FIG. 4 is a flowchart of a risk identification method 400 for transactions to be processed, according to an exemplary embodiment. As shown in FIG. 4, the method 400 may include the following steps:

In step 402A, the risk of a transaction to be processed is identified by a fast identification layer in a risk control system to obtain a first identification result.

In the embodiment, the first identification result corresponds to the identification result obtained by the risk control system through the fast identification layer of the related technology (FIG. 2). The first identification result can be obtained by the risk control system by applying the fast identification rules to the transaction to be processed.

In step 402B, a second identification result is obtained by identifying an interference risk of the transaction to be processed through the above-described identification model pertaining to transactions susceptible to interference.

In the embodiment, there is no necessary sequence in obtaining the first identification result and the second identification result.

In the embodiment, as the fast identification layer adopts far fewer fast identification rules than the number of in-depth rules adopted by the in-depth identification layer, even if there is a certain degree of influence between the model for identifying transactions susceptible to interference and the fast identification rules, the fast identification rules may be optimized based on the lower cost and higher efficiency, thereby reducing the maintenance difficulty and maintenance cost of the risk control system.

In the embodiment, the model for identifying transactions susceptible to interference may be generated based on machine learning of positive and negative samples (which may include various types of machine learning such as decision tree-based machine learning or in-depth learning based on neural networks, etc., which is not limited here). The positive samples include interfered transactions, and the negative samples include transactions not interfered that do not actually have pose a risk. In the embodiment, a model for identifying transactions susceptible to interference is generated through the adoption of the manner of machine learning, which may achieve the automatic creation and update of the model for identifying transactions susceptible to interference, exempt or greatly reduce the maintenance costs of the operator for the model for identifying transactions susceptible to interference, and improve the maintenance efficiency of the model for identifying transactions susceptible to interference. Learning from transactions that have already occurred and been interfered makes the model for identifying transactions susceptible to interference fully grasp characteristics of transactions susceptible to interference, thereby enabling accurate identification of transactions susceptible to interference without creating identification rules pertaining to interference.

In one embodiment, when the model for identifying transactions susceptible to interference is in an initialization state, the above-described positive samples are obtained by weighted sampling of all transactions within a specified historical time period. For example, the weighted value of a weighted sample is negatively related to an interval between the sampling time and the time of occurrence of the collected transaction sample, which causes the model for identifying transactions susceptible to interference to comprehensively learn the transactions susceptible to interference while ensuring the model for identifying transactions susceptible to interference is able to adapt to the development and changes of transactions susceptible to interference. For example, the weighting of the positive samples may conform to the following formula: $w_i = e^{-\eta \alpha_i}$, where $w_i$ is the weight corresponding to the $i^{th}$ positive sample, $\eta$ is a predefined adjustable parameter, and $\alpha_i$ is the time interval corresponding to the $i^{th}$ positive sample. Since the probability of change and degree of change of the negative samples are usually low, the negative samples may be obtained by evenly sampling all the transactions within the specified historical time period.

In another embodiment, when the model for identifying transactions susceptible to interference is a newer model obtained by updating an older model, the positive samples may include at least one of the following: transactions susceptible to interference not identified in the older version model, transactions susceptible to interference identified in the older version model. Here, transactions susceptible to interference not identified in the older version model adapt to the development and changes of transactions susceptible to interference to make the model for identifying transactions susceptible to interference able to learn the latest transactions susceptible to interference; while the transactions susceptible to interference identified in the older version mode inherit the characteristics of the transactions susceptible to interference learnt by the older version model. Here, the negative samples may be obtained by evenly sampling all the transactions within the time period of the positive samples.

In the embodiment, the version of model for identifying transactions susceptible to interference may be updated according to a preset period. Since the model for identifying transactions susceptible to interference is obtained through machine learning, the version update process can be automated for high efficiency and minimal maintenance costs.

In step 404, a processing manner for the transaction to be processed is determined based on the first identification result and the second identification result, the processing manner including releasing the transaction to be processed, or further identifying risks pertaining to the transaction to be processed via the in-depth identification layer in the risk control system.

In the embodiment, values of a decision function $f(R,D)$ can be calculated according to the following formula: $f(R,D) = R \cdot I(\beta > R > \alpha) \cdot e^{-D} + I(R \geq \beta)$, where R is a risk score included in the first identification result, D is an interference tendency score included in the second identification result, $\alpha$ and $\beta$ are preset parameter values and $0 < (\alpha, \beta) < 1$, the value of $I(x)$ is 1 when condition x is satisfied, or is 0 when condition x is not satisfied; when $f(R,D) < \theta$, the processing manner is to release the transaction to be processed; when $\theta < f(R,D) < 1$, the in-depth identification layer of the risk control system further performs risk identification on the transaction to be processed; here, $\theta$ is a preset threshold and $0 < \theta < 1$.

Figure 5:
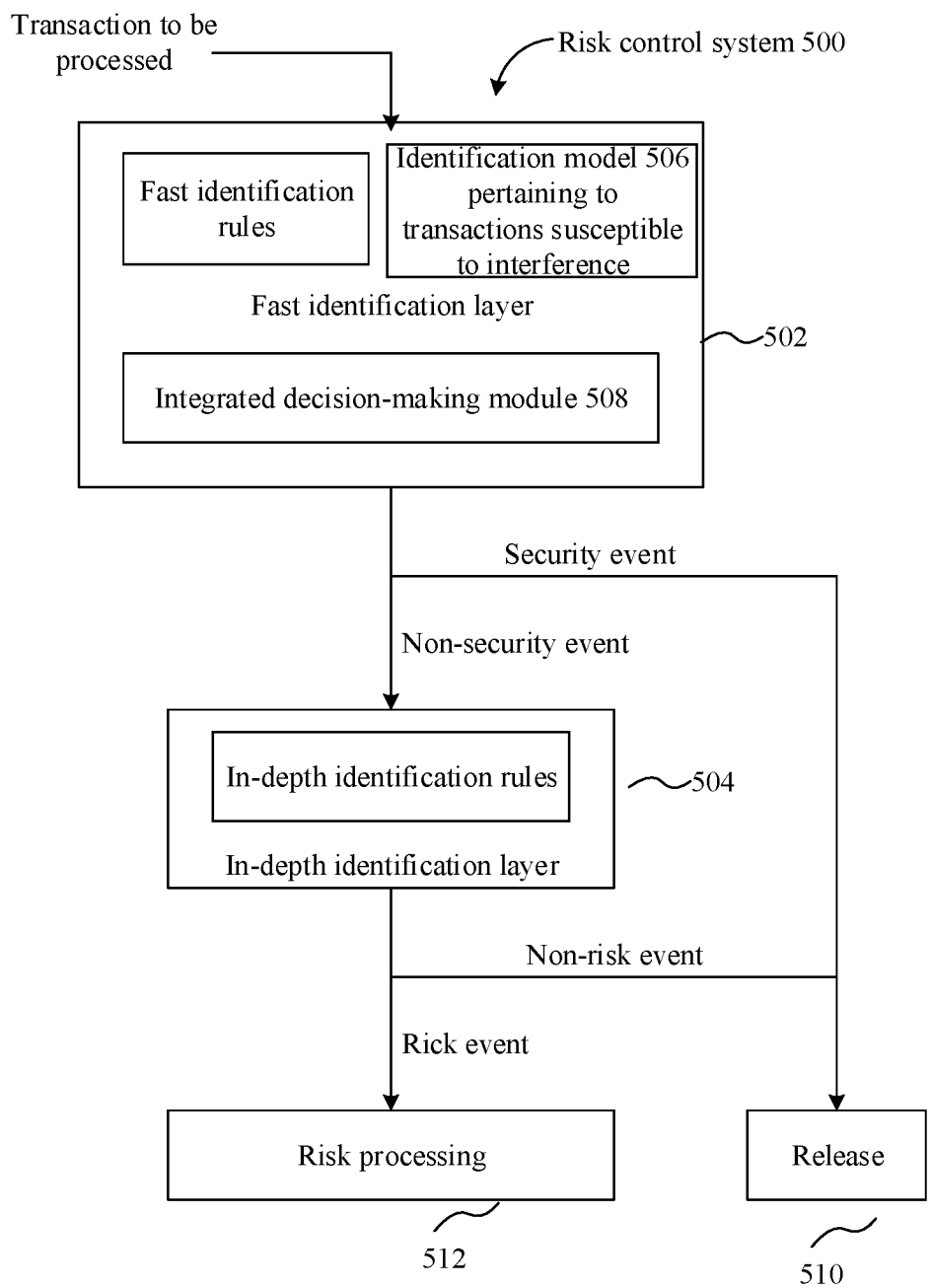
FIG. 5 is a schematic diagram of a risk control system according to an exemplary embodiment.

For ease of understanding, take the following network platform payment scenario as an example, the technical solution of the present application for the risk control system is applied to the process of identifying the risk of account theft of the payment transaction, and the technical solution of the present application is described in detail in combination with FIG. 5.

FIG. 5 is a schematic diagram of a risk control system 500 according to an exemplary embodiment. As shown in FIG. 5, the risk control system 500 includes a fast identification layer 502 (namely layer T1) and an in-depth identification layer 504 (namely layer T2). For example, layer T2 may be the same as layer T2 in FIG. 2 and will not be elaborated here. In the embodiment, layer T1 is improved. As shown in FIG. 5, in the risk control system 500, in addition to the fast identification rules of the relevant technology, layer T1 is also configured with an identification model 506 pertaining to payment transactions susceptible to interference, and an integrated decision-making module 508.

In an embodiment, the risk control system 500 involves an initialization (that is, creation) operation of the identification model 506 pertaining to payment transactions susceptible to interference. The initialization operation can be achieved in the following manner.

Firstly, the risk control system 500 can acquire training samples, which include positive and negative samples, for initialization of the model. For example, a positive sample may be an interfered payment transaction that has occurred, namely, a payment transaction that is identified as having the risk of account theft by the risk control system, but is later verified as not having this risk; and a negative sample may be a payment transaction that is not identified as having the risk of account theft by the risk control system, and is later verified as not having this risk.

The training samples may be obtained from a specified historical time period, such as payment transactions that occurred in the most recent week. Here, since payment transactions susceptible to interference that count as positive samples account for a relatively small proportion of the total number of payment transactions, this is prone to violent fluctuations and changes, thus the required positive samples may be obtained from weighted sampling of all payment transactions. Moreover, the weight value of a weighted sample may be negatively related to the interval between the sampling time and the time of occurrence of the collected transaction sample, causing the positive samples closer to the time of sampling to have a greater influence on the training process, thereby allowing the identification model pertaining to payment transactions susceptible to interference obtained from training to adapt to changes in payment transactions susceptible to interference, to improve the accuracy of identification of payment transactions susceptible to interference.

For example, the weighting of the positive samples may conform to the following formula:

$$w_i = e^{-\eta \alpha_i}$$

where $w_i$ is the weight corresponding to the $i^{th}$ positive sample, $\eta$ is a predefined adjustable parameter, and $\alpha_i$ is the time interval corresponding to the $i^{th}$ positive sample.

For negative samples, since the changes of negative samples are usually smaller, the value can be obtained by uniform sampling.

Then, the training samples obtained can be used to train the initialized identification model pertaining to payment transactions susceptible to interference. In the training process, any of the two-class classification algorithms in the related technology can be used for training. The present application has no limitation on this.

Based on the identification model 506 pertaining to payment transactions susceptible to interference obtained via training, identification can be performed on a payment transaction to be processed in the risk control system 500 to obtain an interference tendency score D for the payment transaction to be processed. At the same time, the payment risk score R for the payment transaction to be processed can be obtained according to the fast identification rules of layer T1, and as shown in FIG. 5, the integrated decision-making module 508 can be used to combine the payment risk score R and the interference tendency score D to determine the processing manner of the payment transaction to be processed.

For example, a decision function f(R,D) may be created, and f(R,D) may be defined as:

$$f(R,D) = R \cdot I(\beta > R > \alpha) \cdot e^{-D} + I(R \geq \beta)$$

where, $\alpha, \beta$ are preset parameter values and $0 < (\alpha, \beta) < 1$, and the value of I(x) is 1 when condition x is met and 0 when condition x is not met.

Accordingly, by setting a threshold value $\theta (0 < \theta < 1)$, the processing manner may be determined according to the relationship between the decision function f(R,D) and the threshold $\theta$, e.g.:

1). when f(R,D)<$\theta$, the processing manner is releasing the payment transaction to be processed (510). Wherein, there may be two scenarios:

Scenario 1: the security level of the payment transaction to be processed is very high so that the payment risk score R meets R<$\alpha$, f(R,D)=0, indicating that the payment transaction to be processed has been determined as secured and can be released directly.

Scenario 2: the payment risk score R meets $\beta > R > \alpha$, indicating that the payment transaction to be processed is subject to payment risks; however, as the payment transaction to be processed is highly likely to be subject to interference, it can thus be determined as a whole that the payment transaction to be processed is susceptible to interference and is released accordingly.

2). When $\theta < f(R,D) \leq 1$, it means that the payment transaction to be processed is subject to certain payment risks and the likelihood of the payment transaction to be processed being subject to interference is low, it can thus be determined that the payment transaction to be processed is not a payment transaction susceptible to interference. The risk pertaining to the payment transaction to be processed is further identified by the T2 layer in the risk control system 500 for processing (512).

As described above, in view that the payment transactions susceptible to interference are subject to changes easily, the model for identifying payment transactions susceptible to interference is continuously updated so that it can accurately identify payment transactions susceptible to interference that have changed.

In the technical solution of this application, the model 506 for identifying payment transactions susceptible to interference may be updated periodically, e.g. updated on a daily or weekly basis, and the frequency may be set according to actual circumstances. The update process is similar to the above described initialization process, with the only difference lying in the training samples used.

For positive samples, there can be two sources. Source 1: the interfered payment transactions identified by the old version model (i.e. the to-be-updated model for identifying payment transactions). As the interfered payment transactions are identified by the old version model, it can be ensured that the new version model will be able to inherit the training results of the old version model, enabling the new version model to identify identical or similar payment transactions susceptible to interference. Source 2: the interfered transactions that occur within the time frame of the positive samples (e.g., the latest 2 days or other time frame), so that the new version model is able to adapt to the update of the payment transactions susceptible to interference; wherein, when the time frame of the positive samples is relatively short, all interfered payment transactions in the time frame of the positive sample can be used; when the time frame of the positive samples is relatively long, the interfered payment transactions in the time frame of the positive samples can be sampled. With respect to the above, references may be made to the above described initialization process.

With respect to negative samples, they may be obtained by evenly sampling the transactions within the time period of the positive samples.

Based on the training samples, the binary classification algorithm may be used for the sample training to obtain the new version model so as to update the model for identifying payment transactions susceptible to interference.

It can be seen from the above technical solution that transactions susceptible to interference may be identified via a fast identification layer and an identification model for transactions susceptible to interference before the in-depth identification of the risk control system, thereby identifying transactions susceptible to interference quickly and accurately in the scenario where risks are controllable, and reducing the probability of interfering transactions susceptible to interference, as well as reducing the impact on the risk control system and lowering the improvement requirements needed for the risk control system.

Figure 6:
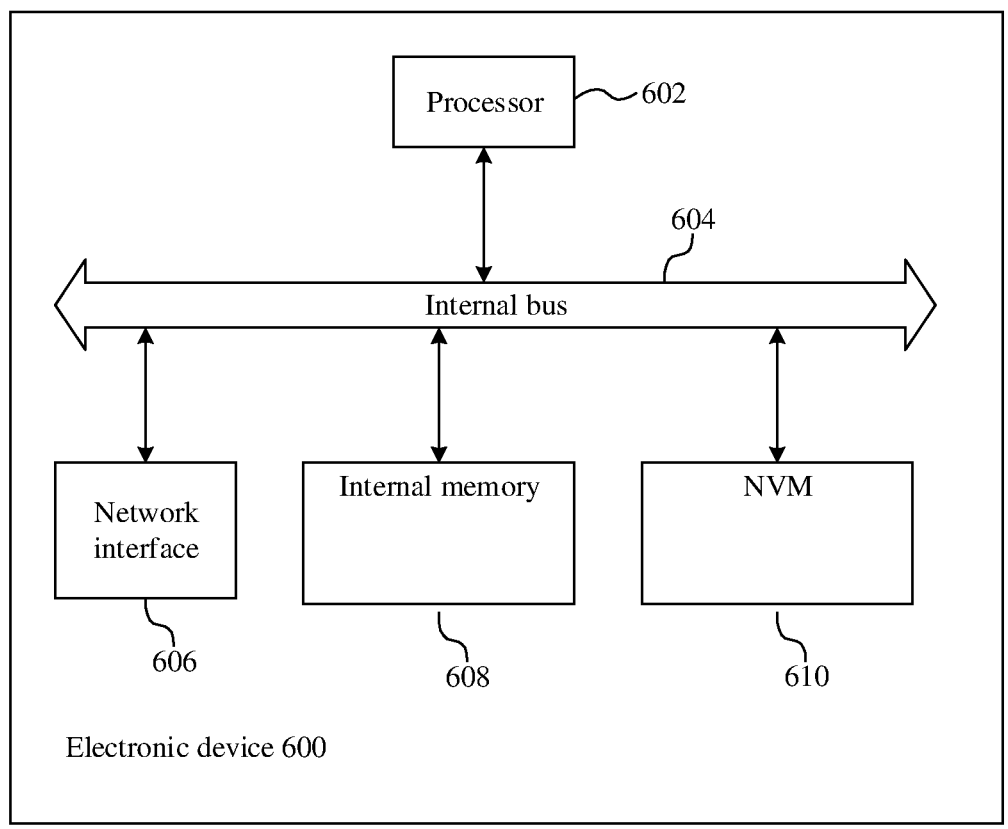
FIG. 6 is a schematic diagram of an electronic device according to an exemplary embodiment.

FIG. 6 is a schematic diagram of an electronic device 600 according to an exemplary embodiment. Referring to FIG. 6, the electronic device 600 includes a processor 602, an internal bus 604, a network interface 606, and a memory such as an internal memory 608 and a nonvolatile memory 610. The electronic device 600 may further include other hardware needed for transactions. The processor 602 reads a corresponding computer program from the nonvolatile memory (NVM) 610 to the internal memory 608 and runs the computer program to form a risk identification apparatus for transactions to be processed at a logical level.

Figure 7:
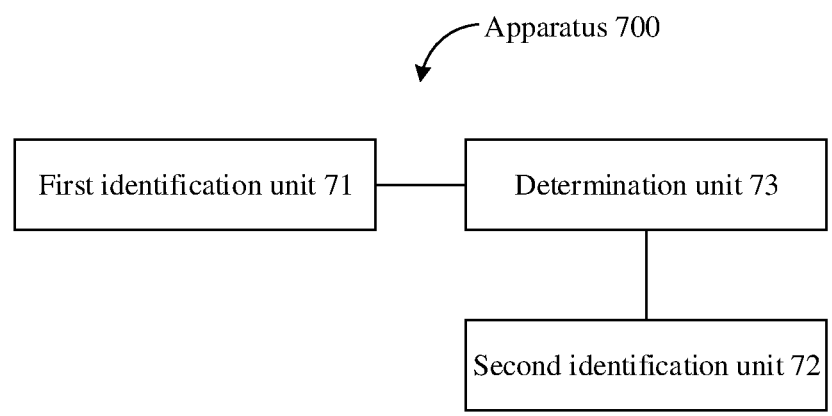
FIG. 7 is a flowchart of a risk identification method for transactions to be processed according to an exemplary embodiment.

FIG. 7 is a schematic diagram of a risk identification apparatus 700 for transactions to be processed, according to an exemplary embodiment. Referring to FIG. 7, the risk identification apparatus 700 for transactions to be processed may include: a first identification unit 71, which identifies risks pertaining to a transaction to be processed via a fast identification layer in a risk control system, thereby obtaining a first identification result; a second identification unit 72, which identifies the risks of interference pertaining to the transaction to be processed via a model for identifying transactions susceptible to interference, thereby obtaining a second identification result; and a determination unit 73, which determines a processing manner for the transaction to be processed based on the first identification result and the second identification result, the processing manner including releasing the transaction to be processed, or further identifying risks pertaining to the transaction to be processed via an in-depth identification layer in the risk control system.

In an embodiment, the model for identifying transactions susceptible to interference is generated by way of machine learning based on positive samples and negative samples, the positive samples including: interfered transactions, and the negative samples including transactions that are not interfered and have no risks.

In an embodiment, when the model for identifying transactions susceptible to interference is in an initial state, the positive samples are obtained by weighted sampling of all transactions in a specified historical period, wherein the weight of weighted sampling is negatively correlated to the interval between the sampling time and the time of the sampled transaction.

In an embodiment, the weight of the positive samples conforms to the following formula:

$$w_i = e^{-\eta \alpha_i},$$

where $w_i$ is the weight of the $i^{th}$ positive sample, $\eta$ is a predefined adjustable parameter, $\alpha_i$ is the interval of the $i^{th}$ positive sample.

In an embodiment, the negative samples are obtained by evenly sampling in all transactions within a specified historical period.

In an embodiment, when the model for identifying transactions susceptible to interference is a new version model obtained by updating an old version model, the positive samples may include at least one of the following: transactions susceptible to interference not identified by the old version model, transactions susceptible to interference identified by the old version model.

In an embodiment, the negative samples are obtained by uniformly sampling all the transactions within the time period of the positive samples.

In an embodiment, the version of the model for identifying transactions susceptible to interference is updated according to a preset period.

In an embodiment, the determination unit 73 is used for: calculating a value of a decision function f(R,D) according to the following formula: $f(R,D) = R \cdot I(\beta > R > \alpha) \cdot e^D + (R \geq \beta)$; where R is a risk score included in the first identification result, D is an interference tendency score included in the second identification result, $\alpha$ and $\beta$ are preset values and $0 < (\alpha, \beta) < 1$, the value of I(x) is 1 when condition x is met and 0 when condition x is not met.

Where $f(R,D) < \theta$, the processing manner is releasing the transaction to be processed; where $\theta < f(R,D) \leq 1$, the in-depth identification layer in the risk control system further identifies risks in the transaction to be processed, wherein $\theta$ is a preset threshold value, and $0 < \theta < 1$.

The electronic devices, apparatuses, modules or units illustrated in the above-described embodiments may be achieved by computer chips or entities, or by products with certain functions, such as a computer. Examples of the electronic devices and apparatuses include a personal computer, laptop computer, cell phone, camera phone, smart phone, PDA (personal digital assistant), media player, navigation device, email sending and receiving device, game console, tablet computer, wearable device or any combination of these devices.

Each of the above described models, modules, and units may be implemented as software, or hardware, or a combination of software and hardware. For example, each of the above described models, modules, and units may be implemented using a processor executing instructions stored in a memory. Also, for example, each of the above described models, modules, and units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In a typical configuration, the computer includes one or more processors (CPUs), I/O interfaces, network interfaces and internal memories.

The internal memories may be computer readable media in the form of volatile memory, random access memory (RAM) and/or non-volatile memory such as read-only memory (ROM) or flash memory (flash RAM). Internal memory is an example of the computer readable media.

Computer readable media include non-volatile and volatile and movable and non-movable media, and information storage may be achieved by any method or technology. Information may be computer readable instructions, data structures, program modules or other data. Examples of computer storage media include but are not limited to phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory, magnetic tape, magnetic disc storage or other magnetic storage devices or any other non-transmission media. They may be used to store information that is accessible to computer devices. The computer readable media here do not include transitory media, such as modulated data signals and carriers.

It should be further noted that terms "include," "comprise" or any variants of these terms are intended to cover non-exclusive inclusion so that a process, method, article or equipment including a series of elements not only includes these elements but also includes other elements that are not expressly listed, or also includes the elements inherent to such process, method, article or equipment. In the absence of more limitations, the element defined by a sentence "include a . . . " does not exclude that the process, method, article or equipment including the element also have another identical element.

Here, exemplary embodiments are described in detail, with examples shown in the accompanying drawings. When the description involves the accompanying drawings, unless otherwise indicated, the same numeral in different accompanying drawings stands for the same or similar element. The implementation manners described in the exemplary embodiments do not represent all the implementation manners consistent with the present application. To the contrary, they are merely examples of the apparatus and method described in detail in the attached claims and are consistent with some aspects of the present application.

The terms used in the description are merely for the purpose of describing certain embodiments, instead of limiting the specification. The singular forms "a," "the" and "this" used in the description and in the attached claims also are intended to cover plural forms unless their meanings are otherwise clearly indicated in the context. It should also be understood that the term "and/or" used in the text refers to any or all possible combinations containing one or more of the associated listed items.

It should be understood that although the specification may use terms such as first, second and third to describe various kinds of information, the information should not be limited to these terms. These terms are only intended to differentiate information of the same type. For example, without departing from the scope of the specification, first information may also be referred to as second information, and similarly, second information may also be referred to as first information. Subject to the context, the term "if" used here may be interpreted as "at the time of . . . ," "when . . . ," or "in response to a determination."

The above embodiments are merely exemplary embodiments but not intended to limit the specification, and various modifications and changes can be made thereto without departing from the scope of the specification. The scope of the specification is only restricted by the appended claims.

The invention claimed is:

1. A method for identifying a risk pertaining to a transaction to be processed on an online platform, comprising:
generating, in a fast identification layer in a risk control system, a model for identifying transactions susceptible to false-positive interference, wherein the model is generated by machine learning based on positive samples and negative samples, the machine learning including at least one of decision tree-based machine learning or in-depth learning based on neural networks, the positive samples including interfered transactions for training the model for identifying transactions susceptible to false-positive interference, the negative samples including non-interfered transactions that are subject to no risks for training the model for identifying transactions susceptible to false-positive interference, wherein when the model for identifying transactions susceptible to false-positive interference is in an initial state, the positive samples are obtained by weighted sampling all transactions in a specified historical period, wherein a weight of weighted sampling is negatively correlated to an interval between a sampling time and a time of a sampled transaction;
identifying a risk pertaining to the transaction on the online platform via the fast identification layer in the risk control system, thereby obtaining a first identification result;
identifying a risk of false-positive interference pertaining to the transaction on the online platform via the model for identifying transactions susceptible to false-positive interference, thereby obtaining a second identification result; and
determining a processing manner for the transaction on the online platform based on the first identification result and the second identification result, the processing manner including releasing the transaction on the online platform, or further identifying the risk pertaining to the transaction on the online platform via an in-depth identification layer in the risk control system,
wherein the risk control system is implemented by a server, and the generating the model for identifying transactions susceptible to false-positive interference, the identifying the risk pertaining to the transaction on the online platform, the identifying the risk of false-positive interference pertaining to the transaction on the online platform, and the determining the processing manner for the transaction on the online platform are performed by a processor of the server.

2. The method according to claim 1, wherein weights of the positive samples comply with formula $w_i = e^{-\eta a}$, where $w_i$ is the weight of an $i^{th}$ positive sample, $\eta$ is a predefined adjustable parameter, and $a_i$, is an interval of the $i^{th}$ positive sample.

3. The method according to claim 1, wherein the negative samples are obtained by evenly sampling in all transactions in the specified historical period.

4. The method according to claim 1, wherein when the model for identifying transactions susceptible to false-positive interference is a newer version model obtained by updating an older version model, the positive samples comprise at least one of: interfered transactions not identified in the older version model, or interfered transactions identified in the older version model.

5. The method according to claim 4, wherein the negative samples are obtained by evenly sampling in all transactions in a period in which the positive samples are obtained.

6. The method according to claim 1, wherein a version of the model for identifying transactions susceptible to false-positive interference is updated according to a preset period.

7. The method according to claim 1, wherein determining the processing manner of the transaction on the online platform based on the first identification result and the second identification result comprises:
   calculating a score of a decision function according to $f(R,D)=R\cdot I(\beta>R>\alpha)\cdot e^{-D}+I(R\geq\beta)$, where $f(R,D)$ is the score of the decision function, R is a risk score included in the first identification result, D is an interference tendency score included in the second identification result, $\alpha$ and $\beta$ are preset values and $0<(\alpha,\beta)<1$, e is a base of a natural exponential function, and a value of $I(x)$ is 1 when condition x is met and 0 when condition x is not met;
   when $f(R,D)<\theta$, the processing manner is releasing the transaction on the online platform; and
   when $\theta<f(R,D)\leq 1$, the in-depth identification layer in the risk control system further identifies the risk pertaining to the transaction on the online platform;
   wherein $\theta$ is a preset threshold value, and $0<\theta<1$.

8. An electronic device operating as a server, comprising:
   a processor; and
   a memory storing instructions executable by the processor;
   wherein the processor is configured to:
      generate, in a fast identification layer in a risk control system, a model for identifying transactions susceptible to false-positive interference, wherein the model is generated by machine learning based on positive samples and negative samples, the machine learning including at least one of decision tree-based machine learning or in-depth learning based on neural networks, the positive samples including interfered transactions for training the model for identifying transactions susceptible to false-positive interference, the negative samples including non-interfered transactions that are subject to no risks for training the model for identifying transactions susceptible to false-positive interference, wherein when the model for identifying transactions susceptible to false-positive interference is in an initial state, the positive samples are obtained by weighted sampling all transactions in a specified historical period, wherein a weight of weighted sampling is negatively correlated to an interval between a sampling time and a time of a sampled transaction;
      identify a risk pertaining to a transaction to be processed on an online platform via the fast identification layer in the risk control system, thereby obtaining a first identification result;
      identify a risk of false-positive interference pertaining to the transaction on the online platform via the model for identifying transactions susceptible to false-positive interference, thereby obtaining a second identification result; and
      determine a processing manner for the transaction on the online platform based on the first identification result and the second identification result, the processing manner including releasing the transaction on the online platform, or further identifying the risk pertaining to the transaction on the online platform via an in-depth identification layer in the risk control system, wherein the risk control system is implemented by the server.

9. The electronic device according to claim 8, wherein weights of the positive samples comply with formula $w_i=e^{-\eta\alpha_i}$, where $w_i$, is the weight of an $i^{th}$ positive sample, $\eta$ is a predefined adjustable parameter, and $\alpha_i$, is an interval of the $i^{th}$ positive sample.

10. The electronic device according to claim 8, wherein the negative samples are obtained by evenly sampling in all transactions within a specified historical period.

11. The electronic device according to claim 8, wherein when the model for identifying transactions susceptible to false-positive interference is a newer version model obtained by updating an older version model, the positive samples include at least one of: interfered transactions not identified in the older version model, interfered transactions identified in the older version model.

12. The electronic device according to claim 11, wherein the negative samples are obtained by evenly sampling in all transactions within a period in which the positive samples are obtained.

13. The electronic device according to claim 8, wherein a version of the model for identifying transactions susceptible to false-positive interference is updated according to a preset period.

14. The electronic device according to claim 8, wherein the processor is further configured to: calculate a score of a decision function according to $f(R,D)=R\cdot I(\beta>R>\alpha)\cdot e^{-D}+I(R\geq\beta)$, where $f(R,D)$ is the score of the decision function, R is a risk score included in the first identification result, D is an interference tendency score included in the second identification result, $\alpha$ and $\beta$ are preset values and $0<(\alpha,\beta)<1$, e is a base of a natural exponential function, and the value of $I(x)$ is 1 when condition x is met and 0 when condition x is not met;
   when $f(R,D)<\theta$, the processing manner is releasing the transaction on the online platform; and
   when $\theta<(f(R,D)\leq 1$, the in-depth identification layer in the risk control system further identifies the risk pertaining to the transaction on the online platform,
   wherein $\theta$ is a preset threshold value, and $0<\theta<1$.

15. A non-transitory computer-readable storage medium having stored therein instructions that, when executed by a processor of a device operating as a server, cause the device to perform a method for identifying a risk pertaining to a transaction to be processed on an online platform, the method comprising:
   generating, in a fast identification layer in a risk control system, a model for identifying transactions susceptible to false-positive interference, wherein the model is generated by machine learning based on positive samples and negative samples, the machine learning including at least one of decision tree-based machine learning or in-depth learning based on neural networks, the positive samples including interfered transactions for training the model for identifying transactions susceptible to false-positive interference, the negative samples including non-interfered transactions that are subject to no risks for training the model for identifying transactions susceptible to false-positive interference, wherein when the model for identifying transactions susceptible to false-positive interference is in an initial state, the positive samples are obtained by weighted sampling all transactions in a specified historical period, wherein a weight of weighted sampling is negatively correlated to an interval between a sampling time and a time of a sampled transaction;

identifying a risk pertaining to the transaction on the online platform via the fast identification layer in the risk control system, thereby obtaining a first identification result;

identifying a risk of false-positive interference pertaining to the transaction on the online platform via the model for identifying transactions susceptible to false-positive interference, thereby obtaining a second identification result; and determining a processing manner for the transaction on the online platform based on the first identification result and the second identification result, the processing manner including releasing the transaction on the online platform, or further identifying the risk pertaining to the transaction on the online platform via an in-depth identification layer in the risk control system, wherein the risk control system is implemented by the server.

* * * * *

UNITED STATES PATENT AND TRADEMARK OFFICE
CERTIFICATE OF CORRECTION

| | | |
|---|---|---|
| PATENT NO. | : 11,494,774 B2 | Page 1 of 1 |
| APPLICATION NO. | : 16/440164 | |
| DATED | : November 8, 2022 | |
| INVENTOR(S) | : Yicheng Lu et al. | |

It is certified that error appears in the above-identified patent and that said Letters Patent is hereby corrected as shown below:

In the Specification

Column 7, Line 45, "$w_i = e^{-\eta\alpha}$" should read as -- $W_i = e^{-\eta\alpha_i}$ --.

Column 10, Line 3, "$w_i = e^{-\eta\alpha}$" should read as -- $W_i = e^{-\eta\alpha_i}$ --.

In the Claims

Claim 2, Column 12, Line 51, "$w_i = e^{-\eta\alpha}$" should read as -- $W_i = e^{-\eta\alpha_i}$ --.

Claim 9, Column 14, Line 3, "$w_i = e^{-\eta\alpha}$" should read as -- $W_i = e^{-\eta\alpha_i}$ --.

Signed and Sealed this
Fourteenth Day of March, 2023

*Katherine Kelly Vidal*

Katherine Kelly Vidal
*Director of the United States Patent and Trademark Office*